United States Patent Office 3,098,008
Patented July 16, 1963

3,098,008
METHOD FOR TREATMENT OF DERMATOLOGICAL DISORDERS
Seymour L. Shapiro, Hastings on Hudson, and Louis Freedman, Bronxville, N.Y., assignors to U.S. Vitamin & Pharmaceutical Corporation, New York, N.Y., a corporation of Delaware
No Drawing. Filed Oct. 5, 1960, Ser. No. 60,548
2 Claims. (Cl. 167—55)

This application is a continuation-in-part of our copending application, Serial No. 676,386, filed August 5, 1957, now U.S. Patent 2,961,377, relating to certain $N^1$-substituted biguanides and novel compositions containing same, and the oral administration thereof to humans afflicted with diabetes mellitus, for the controlled reduction of the sugar levels in the blood and urine of the diabetic patients.

We have now discovered that even though these compounds and compositions do not similarly lower the sugar levels in non-diabetics, they are useful in the treatment of dermatological disorders, and particularly in acne, furunculosis and related pyodermas; and the present application relates to the method of such treatment as a principal or adjunctive therapy in these disorders.

As pointed out in our earlier application, the essential active ingredient is a biguanide having the following free base structure

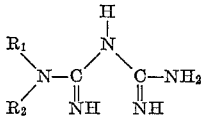

and which is one of the group consisting of:
(a) the compound wherein $R_1$ is $C_4$-$C_5$ alkyl, such as n-butyl and n-amyl, and $R_2$ is hydrogen; (b) the compound wherein $R_1$ is aryl-$(CH_2)_n$—, where $n$ is an integer in the range 1 to 2, the total number of carbon atoms in $R_1$ being 6 to 8, such as benzyl and β-phenethyl, and those substituents wherein the aryl group may be pyridyl, or halophenyl or methoxyphenyl such as 2-(4-pyridyl)ethyl, and p-chlorobenzyl, and $R_2$ is hydrogen; and (c) the compound wherein $R_1$ is benzyl and $R_2$ is methyl.

The biguanides of this invention are all relatively strong bases and form stable salts with inorganic and organic acids and hence the invention suitably employs the biguanides in the form of their salts with non-toxic acids or acidic compounds.

The acids which can be used to prepare acid-addition salts are suitably those which produce, when combined with the free base, salts whose anions are relatively innocuous to animal organisms in therapeutic doses thereof so that the beneficial physiological properties inherent in the free base are not vitiated by side effects ascribable to the anions. Appropriate acid-addition salts are those derived from inorganic acids, such as hydrochloric, hydrobromic, nitric, phosphoric and sulfuric acids; from organic acids such as acetic, citric, malic, tartaric, lactic, glycolic, beta-ethoxy-propionic, amino and sulfonic acids; from acidic nitrogen compounds of the type which can form salts with the biguanide bases such as theophylline, substituted theophyllines and similar purines, saccharin, benzoxazine-2,4-dione and substituted benzoxazine-2,4-dione, oxazolidine-2,4-dione and substituted oxazolidine-2,4-diones, N-p-methylbenzenesulfonyl-N'-n-butyl urea, barbituric acid and substituted barbituric acids, and the like.

When used in the form of its salt the biguanide base is the active portion of the molecule which produces the therapeutic effect but the salt component used can contribute desirable ancillary properties as for example, causing superior absorption, slower or more rapid absorption, and the like; and the selection of the salt also affords practical advantages such as increased or decreased solubility in physiological environment, as well as formulatory factors of lessened sensitivity to hygroscopicity.

Further, as pointed out in our earlier application, the biguanides may be prepared by methods known in the art. Thus, fusion of equivalent quantities of an amine hydrochloride, $(R_1R_2NH \cdot HCl)$ and dicyandiamide for 0.5–3.0 hours at 120–200° C. affords the hydrochloride of biguanide as illustrated by the following general formula:

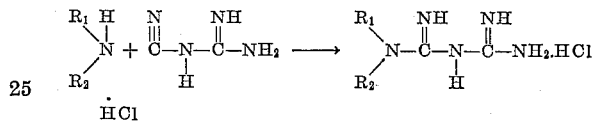

Usually, the hydrochloride can be isolated from the fusion mixture by recrystallization. Where the hydrochloride is obtainable only with difficulty or in poor yield, the treatment of an aqueous solution of the fusion mixture with an excess of aqueous sodium nitrate causes precipitation of the less soluble substituted biguanide nitric acid salt, which can be purified. Alternatively, alkalinization and cooling of an aqueous solution of the fusion mixture with sodium hydroxide precipitates the biguanide as the free base which can be separated and purified by recrystallization, and converted to the salt desired by reaction with stoichiometric amounts of acid.

Illustrative of the compounds used in the present invention, and of the procedure for their preparation, is the following which will serve to make apparent the compounds embraced by the general formulas given above and the preparation thereof, respectively.

EXAMPLE 1

*N'-β-Phenethyl Biguanide Hydrochloride*

β-Phenethylamine hydrochloride (15.76 g.) and 8.4 g. of dicyandiamide were ground and intimately mixed. The mixture was heated in an oil bath in a 3-necked flask fitted with a thermometer and stirrer, and the mixture began to melt at a bath temperature of 125° C. and was completely fluid at 130° C. Further heating at 145–150° C. initiated an exothermic reaction and the temperature of the fusion mixture (156° C.) exceeded the oil bath temperature (150° C.) by 6°. Heating was continued for one hour at bath temperature of 148–150° C. The reaction mixture was cooled, dissolved in about 100 cc. of methanol and filtered. The methanol filtrate was concentrated under reduced pressure, cooled and the product (β-phenylethyl biguanide hydrochloride) filtered off and recrystallized from 95% isopropyl alcohol.

*Analysis.*—Calcd. for $C_{10}H_{16}N_5Cl$: C, 49.7; H, 6.7; N, 29.0. Found: C, 49.7; H, 6.7; N, 29.4.

Typical other biguanides and salts thereof, similarly prepared by the method above or by procedures familiar to those skilled in the art, are the following compounds listed in Table I, which are utilizable for the method of this application although it is to be understood that other biguanides and salts thereof shown in our earlier application can be used.

TABLE I

| $R_1$ | $R_2$ | HX | M.p., °C. |
|---|---|---|---|
| $C_6H_5CH_2$— | H | HCl | 196–197 |
| p-ClC$_6$H$_4$CH$_2$— | H | HNO$_3$ | 137–138 |
| m-BrC$_6$H$_4$CH$_2$— | H | HNO$_3$ | 135–137 |
| p-CH$_3$OC$_6$H$_4$CH$_2$— | H | | 132–134 |
| $C_6H_5CH_2$— | CH$_3$ | HCl | 201–203 |
| n-C$_4$H$_9$— | H | HNO$_3$ | 125–126 |
| n-C$_5$H$_{11}$— | H | HCl | 173–174 |
| 2-picolyl | H | HCl | 177–178 |
| 2-(4-pyridyl)ethyl | H | ½H$_2$SO$_4$.H$_2$O | 221–222 |

For use on our method herein disclosed and claimed, we prefer that the biguanides are compounded with an excipient which is non-toxic, edible or potable, solid or liquid, and chemically inert to the substituted biguanide salts. The proportion of the excipient should be at least sufficient to separate the particles of the therapeutic agent from each other, and to cause quick solution or dispersion of the resultant composition when contacted with the gastric juice of the stomach. When the excipient is a solid, the amount thereof may be from about 0.3 to about 4 parts for 1 part of the active ingredient.

As solid excipients utilization may be made of lactose, sucrose, starch, pre-gelatinized starch, gum arabic, gum tragacanth and mixtures of these. Suitably, the solid excipient may contain also admixed magnesium stearate, talc, cornstarch, or two or more of these additives to promote separation of the composition from the plunger and mold used in shaping the compositions into tablets for use orally.

As an example, and by way of illustration only, the following formulation may be noted:

*Therapeutic Tablet*

| | Weight in mgs. |
|---|---|
| β-Phenethylbiguanide hydrochloride | 25 |
| Sucrose | 100 |
| Starch | 22 |
| Acacia | 8 |
| Talc | 3 |
| Magnesium stearate | 1.5 |
| Stearic acid | 1.6 |

It will be understood that the biguanide derivatives mentioned above may be used singly or in conjunction with each other and that in the above composition the β-phenethylbiguanide may be substituted in whole or in part by any of the other biguanides described and claimed herein.

In the practice of the method of treatment of the dermatological disorders here involved, the preferred method is to administer the compositions herein described as tablets containing 25 or 50 mg. of active ingredient, in divided doses. The dosage schedule is preferably controlled so that smaller levels of the therapeutic composition are given early in the treatment, and increased if necessary to levels of from 150–300 mg. of active ingredient per day depending on the tolerance by the patient and the severity and responsiveness of his dermatologic affliction.

While the specific nature of the therapeutic principle involved in this method of treating the above-mentioned dermatologic disorders by biguanide therapy is as yet imperfectly understood, and while as noted above these compounds do not tend to lower the blood and urine sugar levels of non-diabetic humans, it is believed that in the present method the biguanides correct local disturbances of carbohydrate metabolism involved in the dermatologic disorder either through specific influence upon the skin or underlying fat pad metabolism. In support of this possible explanation, we have found that β-phenethylbiguanide hydrochloride and other of the afore-mentioned biguanides promote glucose uptake and utilization by skin slices in vitro.

In clinical tests of our method, a series of severe pustular type acne patients were treated all of whom had previously been resistant to other treatment or who were of the type where effective treatment would be a problem. With our method 66% of the patients showed improvement under a dosage schedule of one 25 mg. tablet of β-phenethylbiguanide hydrochloride twice a day for three days, one tablet three times a day for seven days, and then one tablet four times a day to the end of treatment. Therapeutic effectiveness was noted within periods of from one to two months with no side reactions being noted.

Similar results have been obtained in other clinical series, for example, in a series of 16 pyoderma patients, β-phenethylbiguanide hydrochloride was effective in all but one case.

It is to be understood that it is here intended to cover all changes and modifications of the example of the invention herein chosen for the purpose of illustration which do not constitute departures from the spirit and scope of the invention.

We claim:

1. The method of treatment of acne, furunculosis and pyoderma which comprises oral administration to a human so afflicted, a biguanide having the following free base formula

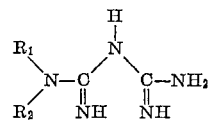

and which is one of the group consisting of: (a) the compound wherein $R_1$ is a $C_4$–$C_5$ alkyl, and $R_2$ is hydrogen; (b) the compound wherein $R_1$ is aryl-$(CH_2)_n$—, where $n$ is an integer in the range 1 to 2, the total number of carbon atoms in $R_1$ being 6–8, and $R_2$ is hydrogen; and (c) the compound wherein $R_1$ is benzyl and $R_2$ is methyl; and the substantially non-toxic salts thereof; said oral administration being in an amount which is sufficient to exert curative and alleviative effects in acne, furunculosis and pyoderma.

2. The method of claim 1, wherein the biguanide is β-phenethylbiguanide.

References Cited in the file of this patent

UNITED STATES PATENTS 2,961,377    Shapiro    Nov. 22, 1960